Patented Sept. 2, 1952

2,609,300

UNITED STATES PATENT OFFICE 2,609,300

STABILIZED EMULSIONS AND PROCESS OF PRODUCING THE SAME

Arnold B. Storrs, Palos Heights, and James R. Froedge, Homewood, Ill., assignors to Armour and Company, Chicago, Ill., a corporation of Illinois No Drawing. Application March 14, 1951, Serial No. 215,633

19 Claims. (Cl. 99—123)

This invention relates to new and useful food products composed of stabilized emulsions of oil in water, and processes for producing the same. More particularly, the invention relates to heat sterilizable, stable oil-in-water type emulsions containing a particularly effective class of emulsifiers as ingredients thereof.

It has long been felt desirable to have a spreadable food product possessing all the advantages of butter and at the same time having the property of withstanding storage and treatment temperatures which are ordinarily encountered in various climates of the world but which are so severe as to cause butter to deteriorate. Butter itself is a water-in-oil emulsion in which a matrix of plastic fat encloses an aqueous phase of buttermilk and water, the latter phase being dispersed in the fat in the form of very fine droplets. The plastic emulsion alone is very stable at ordinary temperatures and is capable of withstanding breakdown of the emulsion without the addition of emulsifying agents. However, when subjected to temperatures above the melting point of the fat, the butter tends to "oil off" and separate into a fat phase and an aqueous phase.

Thus, although butter is a product rich in food content and possessed of many desirable characteristics, as reflected by its dominant position in the world production of fat and oil foods, there is inherent in the product the difficulty that it will not stand up long in storage at elevated temperatures and must be kept under refrigeration in many climates of the world.

An object of the present invention is to provide a product resembling butter in appearance, flavor, and spreading characteristics, but having superior keeping quality, particularly at elevated temperatures. A further object of the invention is to provide an oil-in-water type emulsion product which is capable of withstanding sterilization temperatures, as well as storage for long periods in either tropical or frigid climates, without breakdown of the emulsion. A still further object to provide an oil-in-water type emulsion containing, as emulsifiers, a class of compounds which have been found particularly effective in stabilizing the product against disruption of the emulsion even at temperatures below the solidification point of the oil. Yet a further object is to provide processes for producing the improved products referred to above. Other objects and advantages of the invention will become apparent as the specification proceeds.

As previously mentioned, butter is a water-in-oil type emulsion, and its major disadvantage stems from the fact that it melts, with separation of the phases, when the temperature exceeds the melting point of the fat. It has been suggested at various times that this disadvantage might be overcome, while still retaining butter in the water-in-oil emulsion form, by adding emulsifying agents or hardening the fat to raise the melting point. However, although butter treated in this manner is rendered somewhat more stable at higher temperatures, there is the serious disadvantage that the substance, so stabilized as not to melt at body temperature or above, will not melt in the mouth as butter does but instead possesses a pasty or harder plastic consistency which is most unpalatable and objectionable.

We have now discovered that it is possible to prepare a reverse oil-in-water type emulsion which not only resembles butter in all its favorable characteristics, but also surpasses butter in that it possesses superior keeping qualities at higher temperatures. We have found that such a product may be produced by forming an emulsion of oil-in-water and incorporating therein as an emulsifying agent a fatty acid substituted protein hydrolyzate in which the fatty acid portion is at least 50% by weight of the protein hydrolyzate portion.

The resulting oil-in-water emulsion resembles butter in appearance and taste, and in addition possesses the plastic consistency needed for spreading. Unlike any oil-in-water emulsions known heretofore, it can be sterilized by heat and can be stored for long periods at temperatures as high as 120° F. without breakdown of the emulsion and thus without giving up its desirable spreading characteristics. Moreover, it is also capable of being stored for great lengths of time at temperatures well below the solidification point of the fat phase, and in fact at temperatures near 0° F., without damage to the emulsion stability.

In one embodiment of our invention, we first disperse the fatty acid substituted protein hydrolyzate, referred to above as the emulsifying agent, in water together with a bodying agent, if desired. Melted oil or fat is then blended into the aqueous phase at a temperature of approximately 150° F. using an ordinary blade type mixer. The temporary emulsion thus formed is next completely dispersed by running it through a colloid mill or, preferably, a homogenizer. The resulting product is then sealed in suitable cans or other containers and is heat sterilized at temperatures up to 250° F. for about 20 minutes.

As the emulsifying agent, we employ a substance which may be described as a fatty acid substituted protein hydrolyzate in which the fatty acid portion is at least 50% by weight of the protein hydrolyzate portion. Several examples of such compounds are described in the co-pending application of Havard L. Keil, Serial No. 66,393, filed December 20, 1948, entitled "Improved Method for Reacting Fatty Acid Chlorides with Proteins." In accordance with the procedure set out in the Keil application, the requisite amount of fatty acid is made to react with a protein hydrolyzate by first treating the hydrolyzate with a hydroxylating agent to substitute a hydroxyl group for one of the hydrogen atoms in the free —NH$_2$ groups attached to the protein hydrolyzate. The protein-substituted hydroxyl amine thus formed can then be reacted with at least 50% by weight of a fatty acid halide to provide one form of the fatty acid substituted protein hydrolyzate suitable for use as an emulsifier in the present invention.

Another modification of the emulsifying agent may be prepared by hydrolyzing a protein to obtain a hydrolyzate having both free amino and free carboxyl groups, covering up the carboxyl groups by esterification with an esterifying agent (e. g. ethylene oxide) in order to render the hydrolyzate more basic, and then reacting the esterified hydrolyzate with at least 50% by weight of a fatty acid halide to provide another form of the fatty acid substituted protein hydrolyzate suitable for use as an emulsifying agent in the present invention.

Any other suitable method may be employed for preparing the emulsifier. We have found that it is necessary for the fatty acid portion of the emulsifier to be at least about 50% by weight of the protein portion in order to impart the desired characteristics to our oil-in-water emulsions. Fatty acid fractions as high as 400% have been employed, and a very satisfactory proportion has been found to be a 100% fatty acid fraction (i. e. equal weights of fatty acid and protein). In connection with preparation of emulsifier, is may be noted that fatty acid halides and protein hydrolyzates themselves are not highly reactive with each other, and it is ordinarily necessary to practice special methods, such as those described above, in order to react sufficient amounts of fatty acids with the protein hydrolyzate to bring the fatty acid fraction above the minimum of about 50%, as required in our emulsifier.

In preparing the emulsifier contemplated in the present invention, we may use any suitable edible protein. Gelatin, meat, casein, soybean flakes, wheat gluten, peanut protein, corn protein (Zein), and other vegetable protein may be mentioned as specific examples. Gelatin is a readily available substance which has been found particularly suitable.

The emulsifier thus prepared need only be incorporated in the oil-in-water emulsion to provide the stabilized, sterilizable product of the invention. This may be done in any suitable way, and a convenient method is merely to disperse the emulsifier in the aqueous phase and then blend the two phases together, accomplishing the emulsification while the fat or oil is well above its melting point. In one specific embodiment, where butter itself is used as the starting material, the butter is melted and separated into an aqueous phase and a fat phase, whereupon the emulsifier is dispersed in the serum or aqueous phase and the two phases are then blended together at elevated temperatures to form an oil-in-water emulsion, rather than the original water-in-oil emulsion of the butter. Thus, in one embodiment of the invention, we invert the phase of butter and add our emulsifier to produce an oil-in-water type emulsion containing all the normal constituents of butter and resembling butter in taste, appearance, and spreading characteristics, while possessing superior keeping qualities.

In addition to butter itself, any other edible vegetable or animal oil may be employed as the oil or fat. For example, butter oil alone and plastic or washed cream have been used to make satisfactory emulsions. As examples of suitable fats or oils which may be used, other than butterfats, we may mention cottonseed oil, oleo oil, and hydrogenated coconut oil.

Any suitable proportions of oil, water, and emulsifier may be used. The emulsifier of our invention improves the characteristics of oil-in-water emulsions having widely varying ranges of oil content. We have found that compositions containing up to 80% oil are generally satisfactory, and a 60% to 75% oil content provides an excellent product.

A preferred amount of the emulsifier is approximately 3%, computed on a dry basis. Larger or smaller amounts can be employed depending on the ultimate composition desired. Generally suitable emulsions have been prepared using as little as 1% emulsifier, but for adequate stability a larger amount is preferred. It may be observed generally that increasing the emulsifier concentration beyond about 5% tends to increase the gumminess of the product, although this is also influenced by the overall composition of the emulsion.

In addition to the water, oil, and smulsifier, other suitable or desirable ingredients may be used if desired. Thus, a bodying or water-binding agent, such as agar, may be employed to vary the consistency of the emulsified body as preferred. Other bodying agents, such as gelatin, pectin, starch, or gums, may be used with varying degrees of success depending on their compatibility with the particular oil which has been used in the emulsion.

Further, if desired, small amounts of starter distillate may be added to the emulsion as an aid in fortifying the butter taste, and also small quantities of salt may be included. The use of these ingredients is optional, for flavoring purposes, and it does not appear that they have any influence upon the physical characteristics of the emulsion.

A specific example of a suitable composition is as follows:

| | |
|---|---:|
| Moist emulsifier (45% solids) ___grams__ | 267 |
| Agar _____ | 8 |
| Salt _____ | 20 |
| Citric acid _____ | 2.2 |
| Water _____ | 700 |
| Starter distillate _____ | 1 |
| Ascorbic acid _____ | 0.8 |
| Butyl-hydroxy-anisole _____ | 0.8 |
| Butter oil _____ | 3000 |

In producing the above composition, the emulsifier, agar, salt, and citric acid are dissolved in the water, with heat, and constitute the aqueous phase of the emulsion. To this are added, just before mixing the original emulsion, the starter distillate and the ascorbic acid. The butyl-hydroxy-anisole is dissolved in the butter oil and the entire oil phase added to the aqueous fraction with suitable agitation such as provided by a blade mixer (e. g. a Hobart mixer). This results in the formation of a preliminary emulsion which is subsequently dispersed more completely by passage through a colloid mill, a homogenizer, or both. The final emulsion is a very stable, spreadable oil-in-water type emulsion which may be sterilized by heat without loss of emulsion stability.

In compositions such as the above, it is desirable to add citric acid only for its neutralizing effect in case the emulsifier is received for use in a slightly alkaline state. It may also be desirable, as in the above case, to include small amounts of ascorbic acid and butyl-hydroxy-anisole as antioxidants to insure against any slight oxidation during the sterilization step. Although any suitable edible antioxidants may be used, the ascorbic acid and butyl-hydroxy-anisole appear to be more convenient, the former being soluble in the water phase and the latter in the oil phase.

Further specific examples illustrating the invention are given as follows:

Example 1

An emulsifier comprising a fatty acid substituted protein hydrolyzate, in which the fatty acid portion is at least 50% by weight of the protein hydrolyzate portion, was prepared as follows:

2 pounds of gelatin were dissolved in 10 pounds of water. 100 cc. concentrated hydrochloric acid were added and the mixture boiled for one hour. 250 cc. of 20% sodium hydroxide were then added to bring the pH to 6.2, 76 grams of 30% hydrogen peroxide were added to the solution. The pH was brought to 9.9 with 65 cc. of 20% sodium hydroxide, and the solution was allowed to stand overnight.

In the meantime, 2 pounds of lard flake fatty acids were melted and mixed with 164 grams of phosphorous trichloride, and the mixture was allowed to stand overnight in a separatory funnel.

The fatty acid chloride thus prepared was added slowly to the hydrolyzed gelatin with stirring. During addition of the chloride, the pH was held constantly at 7.5 by addition of sodium hydroxide solution. After all the fatty acid chloride had been added, the final pH was adjusted to between 7.5 and 8.0, and the mixture was allowed to stand in the warm at 60° C. to complete the reaction. The final reaction product, which is in pasty form, is spread on vacuum trays and dried in a vacuum oven to give a final dried product suitable for use as the emulsifier in the present invention.

Example 2

An emulsifier was prepared according to the procedure set out in Example 1, except 4 pounds of casein were used in place of the 2 pounds of gelatin, and proportionately increased amounts of sodium hydroxide and hydrogen peroxide were employed. The resulting product was a fatty acid substituted casein hydrolyzate in which the fatty acid portion was approximately 50% by weight of the casein hydrolyzate portion.

Example 3

A batch of spread was prepared having the following composition:

| | | |
|---|---|---|
| Moist emulsifier | grams | 130 |
| Water | | 250 |
| Butter oil | | 1600 |
| Starter distillate | ml | 0.2 |
| Butter color | ml | 6.0 |

The moist emulsifier contained 45% solids and was prepared by the method set out in Example 1. In producing the above composition, the emulsifier was dissolved in the water, with heat. The aqueous phase was placed in a Hobart mixer, and the butter oil was added with suitable agitation. The starter distillate and butter color were also added during the mixing operation. The preliminary emulsion thus produced was then dispersed more completely in a homogenizer which was operated at 3000 p. s. i. on the first stage and 1000 p. s. i. on the second stage. The material was then placed in sealed cans and sterilized by autoclaving for 20 minutes at 240° F.

Example 4

A batch of spread was prepared having the following composition:

| | | |
|---|---|---|
| Moist emulsifier | grams | 9 |
| Water | | 91 |
| Citric acid | | 0.15 |
| Margarine oil | | 300 |

The moist emulsifier contained 45% solids and was prepared by the method set out in Example 1. In producing the above composition, the emulsifier and citric acid were dissolved in the water, with heat. The aqueous phase was placed in a Hobart mixer, and the margarine oil was added with suitable agitation. The preliminary emulsion thus produced was then dispersed more completely by running it through a colloid mill. The resulting emulsion was placed in sealed cans and sterilized by autoclaving for 20 minutes at 140° F.

Example 5

A batch of spread was prepared having the following composition:

| | | |
|---|---|---|
| Moist emulsifier | grams | 9 |
| Water | | 91 |
| Citric acid | | 0.15 |
| Cottonseed oil | | 300 |

The moist emulsifier contained 45% solids and was prepared by the method set out in Example 1. The spread was prepared, packaged, and sterilized according to the method set out in Example 4.

Example 6

A batch of spread was prepared having the following composition:

| | | |
|---|---|---|
| Moist emulsifier | grams | 18 |
| Gelatin | | 9.4 |
| Water | | 80 |
| Citric acid | | 1.9 |
| Starter distillate | | 0.7 |
| Butter oil | | 300 |

The moist emulsifier contained 45% solids and was prepared by the method set out in Example 2. In producing the above composition, the emulsifier, gelatin and citric acid were dissolved in the water, with heat. To this the starter distillate was added just before mixing the first emulsion. The butter oil was then added to the aqueous fraction with agitation in a Hobart mixer. The preliminary emulsion thus formed was then dispersed more completely in a colloid mill, and the resulting emulsion was sealed in cans and sterilized by autoclaving for 20 minutes at 140° F.

*Example 7*

A batch of spread was prepared having the following composition:

| | |
|---|---|
| Dry emulsifier | grams 20 |
| Cornstarch | 15 |
| Water | 115 |
| Washed cream (84% fat) | 350 |

The emulsifier was prepared by the method set out in Example 1. In producing the above composition, the emulsifier and the starch were dissolved in the water, with heat, and the washed cream was then added to the aqueous phase with agitation in a Hobart mixer. The preliminary emulsion thus produced was then dispersed more completely by running it through a colloid mill, and the resulting emulsion was sealed in cans and sterilized by autoclaving for 20 minutes at 140° F.

*Example 8*

A batch of spread was prepared using the following ingredients:

| | |
|---|---|
| Butter | lbs 3 |
| Emulsifier | grams 51 |
| Cornstarch | do 47 |
| Starter distillate | ml 0.15 |
| Cheese color to suit. | |
| Water | ml 243 |

The emulsifier was prepared by the method set out in Example 1. In producing the above composition, the butter was first melted and allowed to separate, after which the fat layer was poured off and saved. The aqueous serum was used with the remainder of the ingredients to prepare the aqueous phase of the emulsion. The serum, emulsifier, starch, and water were mixed and heated to 190° F. for the purpose of putting all the ingredients into solution and insuring liquefaction of the starch. Then the aqueous phase was placed in a Hobart mixer and the butter oil added to give a temporary emulsion. The starter distillate and cheese color were added during this preliminary mixing. The temporary emulsion was then dispersed more completely in a homogenizer which was operated at 3000 p. s. i. on the first stage and 1000 p. s. i. on the second stage. The material was then put up in cans, sealed, and sterilized by autoclaving at 240° F. for 20 minutes.

While in the foregoing specification, we have set forth certain embodiments of the invention in great detail for the purpose of illustrating the invention, it will be understood that such details may be varied considerably by those skilled in the art without departing from the spirit of our invention.

We claim:

1. A heat sterilizable, stable oil-in-water type emulsion containing as an emulsifier therefor a fatty acid substituted protein hydrolyzate in which the fatty acid portion is at least 50% by weight of the protein hydrolyzate portion.

2. A heat sterilizable, stable oil-in-water type emulsion containing as an emulsifier therefor a fatty acid substituted gelatin hydrolyzate in which the fatty acid portion is at least 50% by weight of the gelatin portion.

3. A heat sterilizable, stable oil-in-water type emulsion containing the normal constituents of butter and in addition thereto a fatty acid substituted protein hydrolyzate in which the fatty acid portion is at least 50% by weight of the protein hydrolyzate portion.

4. A heat sterilizable, stable emulsion of butter oil in water containing as an emulsifier therefor a fatty acid substituted protein hydrolyzate wherein the fatty acid portion is at least 50% by weight of the protein hydrolyzate portion.

5. A heat sterilizable, stable emulsion of oleo oil in water containing as an emulsifier therefor a fatty acid substituted protein hydrolyzate wherein the fatty acid portion is at least 50% by weight of the protein hydrolyzate portion.

6. A heat sterilizable, stable emulsion of coconut oil in water containing as an emulsifier therefor a fatty acid substituted protein hydrolyzate wherein the fatty acid portion is at least 50% by weight of the protein hydrolyzate portion.

7. A heat sterilizable, stable oil-in-water type emulsion containing an an emulsifier therefor a fatty acid derivative of a protein substituted hydroxyl amine.

8. A heat sterilizable, stable oil-in-water type emulsion containing the normal constituents of butter and in addition thereto a fatty acid derivative of a protein substituted hydroxyl amine.

9. A heat sterilizable, stable emulsion of butter oil in water containing as an emulsifier therefor a fatty acid derivative of a protein substituted hydroxyl amine.

10. A heat sterilizable, stable emulsion of oleo oil in water containing as an emulsifier therefor a fatty acid derivative of a protein substituted hydroxyl amine.

11. A heat sterilizable, stable emulsion of coconut oil in water containing as an emulsifier therefor a fatty acid derivative of a protein substituted hydroxyl amine.

12. A heat sterilizable, stable oil-in-water type emulsion containing up to 80% by weight of oil and, as an emulsion stabilizer, a small quantity of a fatty acid substituted protein hydrolyzate in which the fatty acid portion is at least 50% by weight of the protein hydrolyzate portion.

13. A heat sterilizable, stable oil-in-water type emulsion containing about 65% by weight of oil and, as an emulsion stabilizer, a small quantity of a fatty acid substituted protein hydrolyzate in which the fatty acid portion is at least 50% by weight of the protein hydrolyzate portion.

14. As an article of manufacture, a sealed container having therein a quantity of an oil-in-water type emulsion containing the normal constituents of butter in inverse phase, and in addition thereto a fatty acid substituted protein hydrolyzate in which the fatty acid portion is at least 50% by weight of the protein hydrolyzate portion.

15. In a process for stabilizing an oil-in-water type emulsion, the step of adding thereto a fatty acid substituted protein hydrolyzate in which the fatty acid portion is at least 50% by weight of the protein hydrolyzate portion.

16. In a process for treating a mixture of oil and water to prepare an oil-in-water type emulsion, the step of adding to the mixture an emulsifier comprising a fatty acid substituted protein hydrolyzate in which the fatty acid portion is at least 50% by weight of the protein hydrolyzate portion.

17. In a process for treating a mixture of oil and water to prepare an oil-in-water type emulsion, the step of adding to the mixture an emulsifier comprising a fatty acid derivative of a protein substituted hydroxyl amine.

18. In a process for producing a heat sterilizable, stable oil-in-water type emulsion from butter, the steps of separating the butter to obtain a fat phase and an aqueous phase, dissolving in the aqueous phase an emulsifying agent comprising a fatty acid derivative of a protein substituted hydroxyl amine, mixing the fat and aqueous phases, and emulsifying the mixture.

19. In a process for preparing a stable spreadable product, the steps of preparing a mixture of oil and water to provide an oil-in-water type emulsion, adding thereto a fatty acid substitute protein hydrolyzate in which the fatty acid portion is at least 50% by weight of the protein hydrolyzate, and sterilizing the resulting emulsion.

ARNOLD B. STORRS.
JAMES R. FROEDGE.

REFERENCES CITED

The following references are of record in the file of this patent:

UNITED STATES PATENTS

| Number | Name | Date |
|---|---|---|
| 2,132,393 | Coith et al. | Oct. 11, 1938 |
| 2,422,633 | Petersen | June 17, 1947 |
| 2,485,634 | Vahlteich | Oct. 25, 1949 |